Nathan L. Griffith Hedge Planter
117,622        PATENTED AUG 1 1871
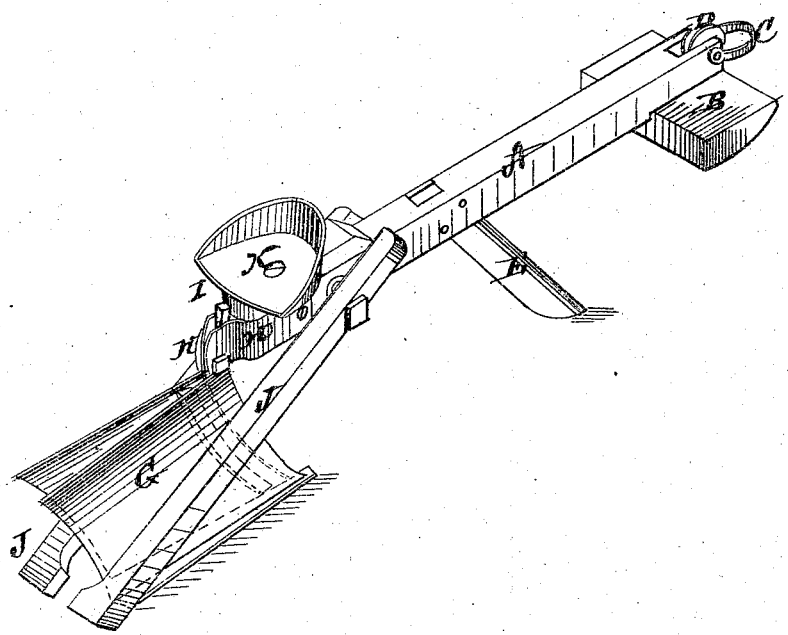

UNITED STATES PATENT OFFICE.

NATHAN L. GRIFFITH, OF SOUTH PLYMOUTH, OHIO.

IMPROVEMENT IN HEDGE-PLANTERS.

Specification forming part of Letters Patent No. 117,622, dated August 1, 1871.

*To all whom it may concern:*

Be it known that I, NATHAN L. GRIFFITH, of South Plymouth, in the county of Fayette and in the State of Ohio, have invented certain new and useful Improvements in Hedge-Planters; and do hereby declare that the following is a full, clear, and exact description thereof, reference being had to the accompanying drawing and to the letters of reference marked thereon making a part of this specification.

The nature of my invention consists in the construction and arrangement of a hedge-planter, as will be hereinafter more fully set forth.

In order to enable others skilled in the art to which my invention appertains to make and use the same, I will now proceed to describe its construction and operation, referring to the annexed drawing, which represents a perspective view of my machine.

A represents the beam, under the front end of which is a board, B, to keep the machine level with the ground. At the end of the beam A is a clevis, C, to fasten a rope to, and in the front end of the beam are one or more pulleys, D. In a block fastened in a line where the plants are to be set is a corresponding number of pulleys, around which the rope passes. The machine will be pulled by this rope and the speed readily regulated. E is a colter, attached to the beam A, to open the way for the plow and to prevent the plow from choking with trash. At the rear end of the beam A are secured metal plates H H, between which the plow G is pivoted. This plow is made of iron or steel, and used to open the ground to receive the plants. A wedge, I, is inserted between the rear end of the beam and the pivoted shank of the plow, to set the plow backward or forward to regulate the depth. For instance, if the wedge is taken out it will let the plow back, thus throwing the point downward and causing the plow to run deep; or by inserting the wedge the point of the plow is raised, causing it to run less deep. Upon the rear end of the beam A is a seat, K, facing backward, for the man that puts the plants in as the machine moves along; and on each side of the said seat, to the sides of the beam, are pivoted beams J J, the rear ends of which are extended inward. The object of these beams is to press the dirt to the plants as they are put in.

Having thus fully described my invention, what I claim as new, and desire to secure by Letters Patent, is—

The plow G, in combination with plates H H, wedge I, beam A, and side beams J J, substantially as described and for the purpose set forth.

In testimony that I claim the foregoing I have hereunto set my hand this 21st day of April, 1871.

NATHAN L. GRIFFITH.

Witnesses:
REUBEN RANKIN,
SMITH RANKIN.